United States Patent
Crews et al.

(10) Patent No.: US 7,217,040 B2
(45) Date of Patent: May 15, 2007

(54) BLIND MATE OPTICAL CONNECTOR

(75) Inventors: Darren S. Crews, Santa Clara, CA (US); Hengju H. Cheng, Mountain View, CA (US); Ken Drottar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/955,582

(22) Filed: Sep. 30, 2004

(65) Prior Publication Data

US 2006/0067627 A1    Mar. 30, 2006

(51) Int. Cl.
G02B 6/38    (2006.01)
G02B 6/40    (2006.01)

(52) U.S. Cl. .......................................... 385/62; 385/75
(58) Field of Classification Search ...................... None
See application file for complete search history.

(56) References Cited

U.S. PATENT DOCUMENTS 6,085,003 A * 7/2000 Knight ........................ 385/59
6,530,696 B1 * 3/2003 Ueda et al. .................... 385/60
6,769,814 B2 * 8/2004 Kiani et al. .................... 385/78
2003/0044125 A1    3/2003 Kiani et al.

FOREIGN PATENT DOCUMENTS

EP    0485196 A    5/1992
EP    1092996 A    4/2001

OTHER PUBLICATIONS

PCT/US2005/033927, International Search Report and Written Opinion, Jan. 16, 2006.

* cited by examiner

Primary Examiner—Michelle Connelly-Cushwa
Assistant Examiner—Jerry T Rahll
(74) Attorney, Agent, or Firm—Blakely, Sokoloff, Taylor & Zafman LLP

(57) ABSTRACT

A connector is disclosed. The connector includes a floating component to receive a first set of optical waveguides, and a fixed component to receive a second set of optical waveguides and to facilitate optical alignment between the first set of waveguides and the second set of waveguides through automated alignments with the floating component.

15 Claims, 6 Drawing Sheets

BLIND MATE OPTICAL CONNECTOR

FIELD OF THE INVENTION

The present invention relates to fiber optic communication; more particularly, the present invention relates to coupling radiant energy from an external waveguide into a waveguide on an integrated circuit.

BACKGROUND

More frequently, optical input/output (I/O) is being used in computer systems to transmit data between system components. Optical I/O is able to attain higher system bandwidth with lower electromagnetic interference than conventional I/O methods.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

According to one embodiment, a fiber optic communication mechanism is disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
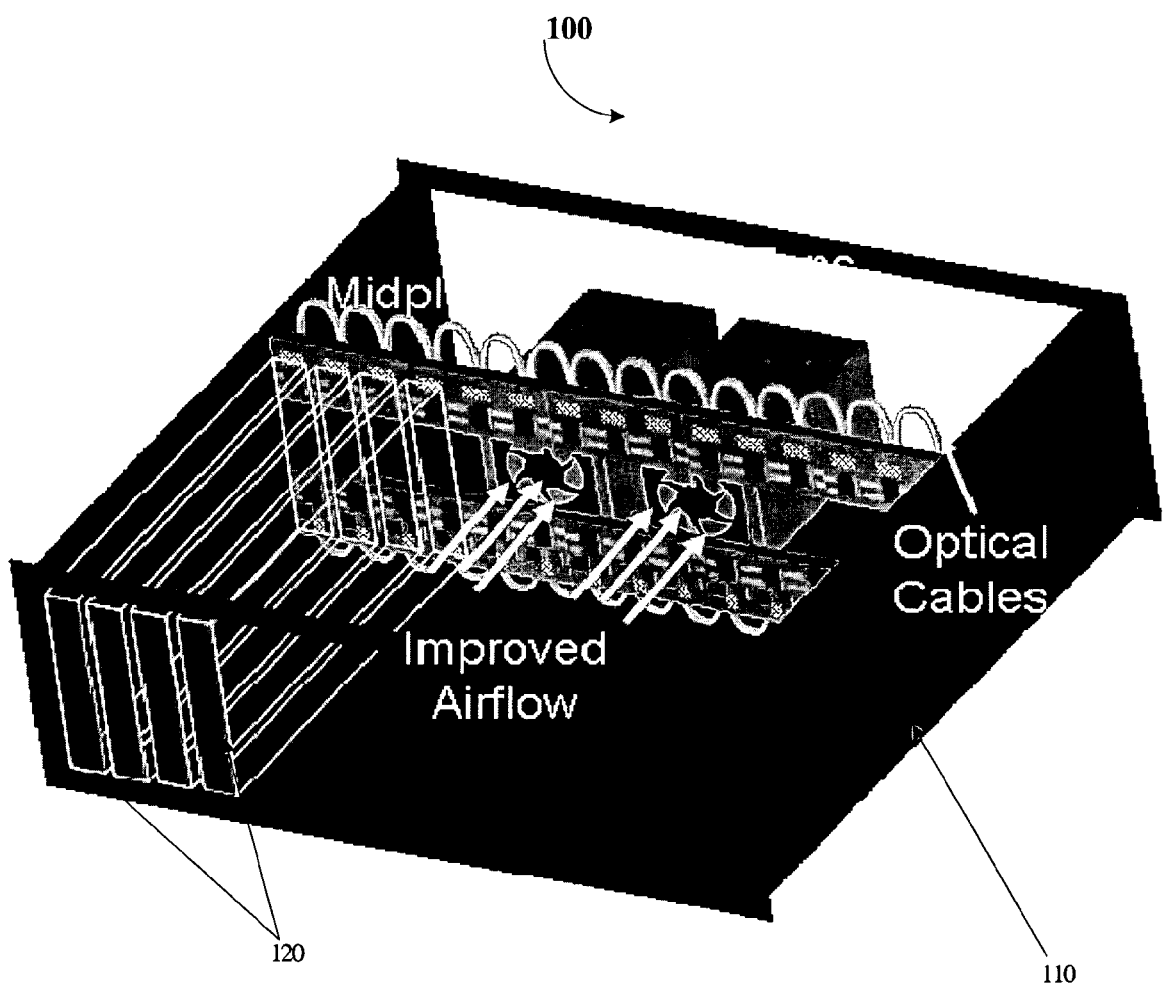
FIG. 1 illustrates one embodiment of a system.

FIG. 1 is a block diagram of one embodiment of a computer system 100. Computer system 100 is a blade server that includes a chassis 110 and blades 120. In one embodiment, blades 120 are "hot-swappable" devices that are coupled to a backplane of chassis 110. Each blade may be an independent server having one or more processors, an associated memory, disk storage and network controllers.

Figure 2:
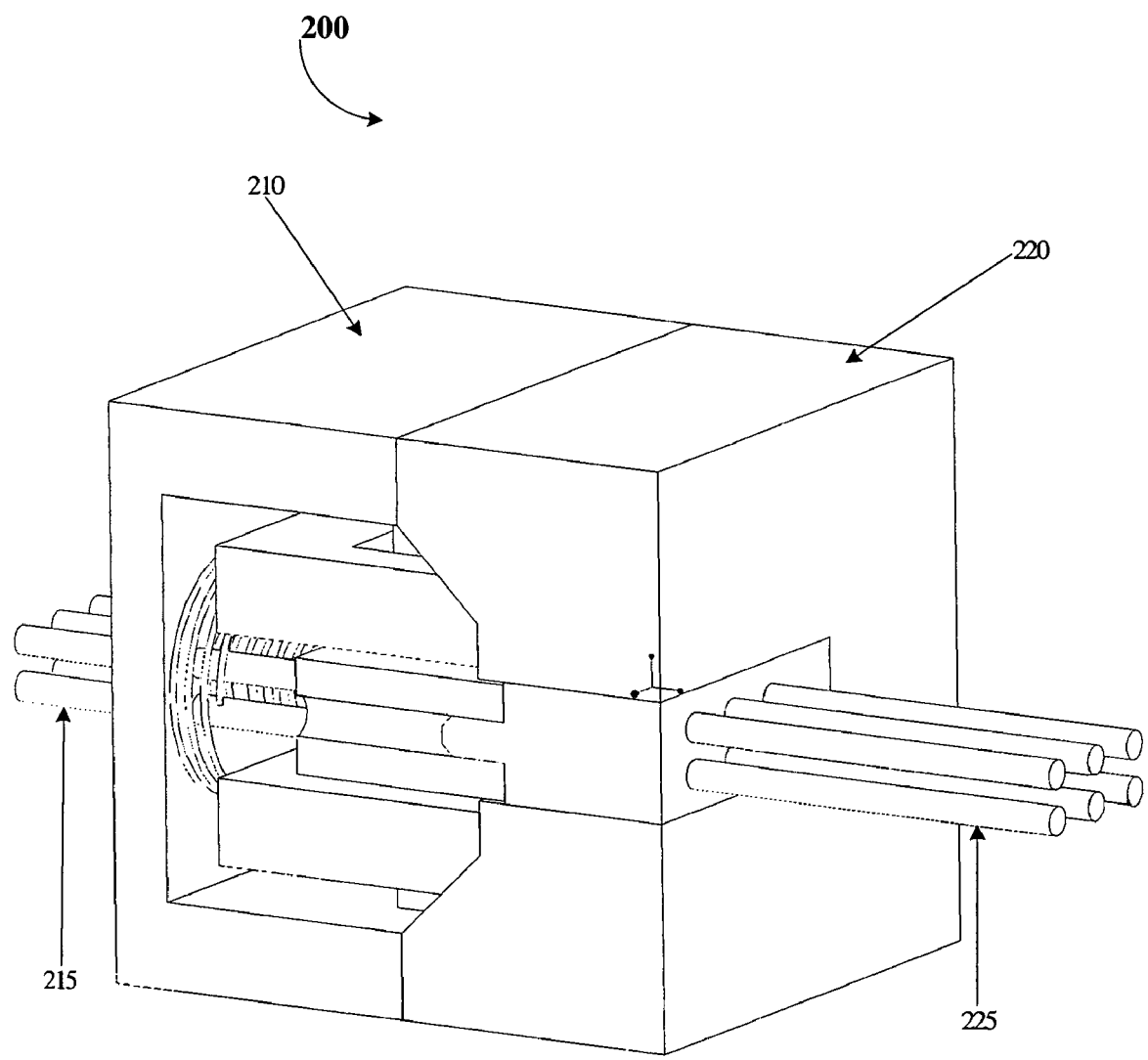
FIG. 2 illustrates one embodiment of (cross section) fiber optic connector.

According to one embodiment, optical fibers are coupled to each of the one or more blades 120 at the backplane to facilitate optical I/O. In a further embodiment, a blind mate connector is included to couple an optical component on a blade 120 to the optical fibers at the backplane. FIG. 2 illustrates one embodiment of a blind mate connector 200.

Referring to FIG. 2, connector 200 includes a floating component 210 and a fixed component 220. Component 210 is coupled to optical fibers 215, while component 220 is coupled to fibers 225. Components 210 and 220 of connector 200 enable precise optical alignment in circumstances where the initial alignment between two systems is coarse. For example, optical alignment between a blade being plugged into a backplane and fibers on the backplane would likely have a course alignment.

According to one embodiment, floating component 210 is mounted on a blade 120, while fixed component 220 is mounted on the backplane. In a further embodiment, floating component 210 and a fixed component 220 provide for precise optical mating through successive self-alignments.

Figure 3:
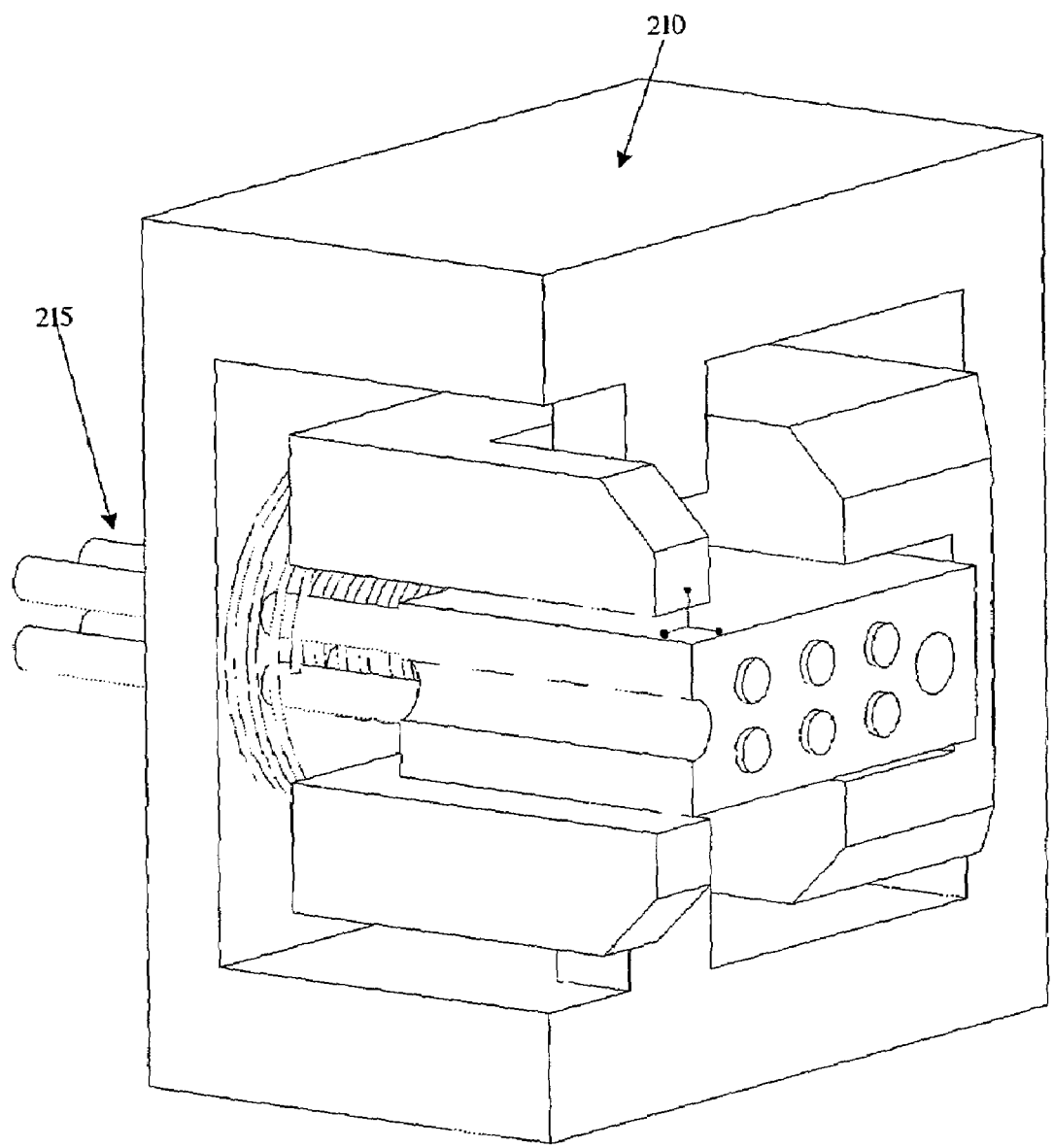
FIG. 3 illustrates one embodiment of a floating side of a fiber optic connector.
Figure 4:
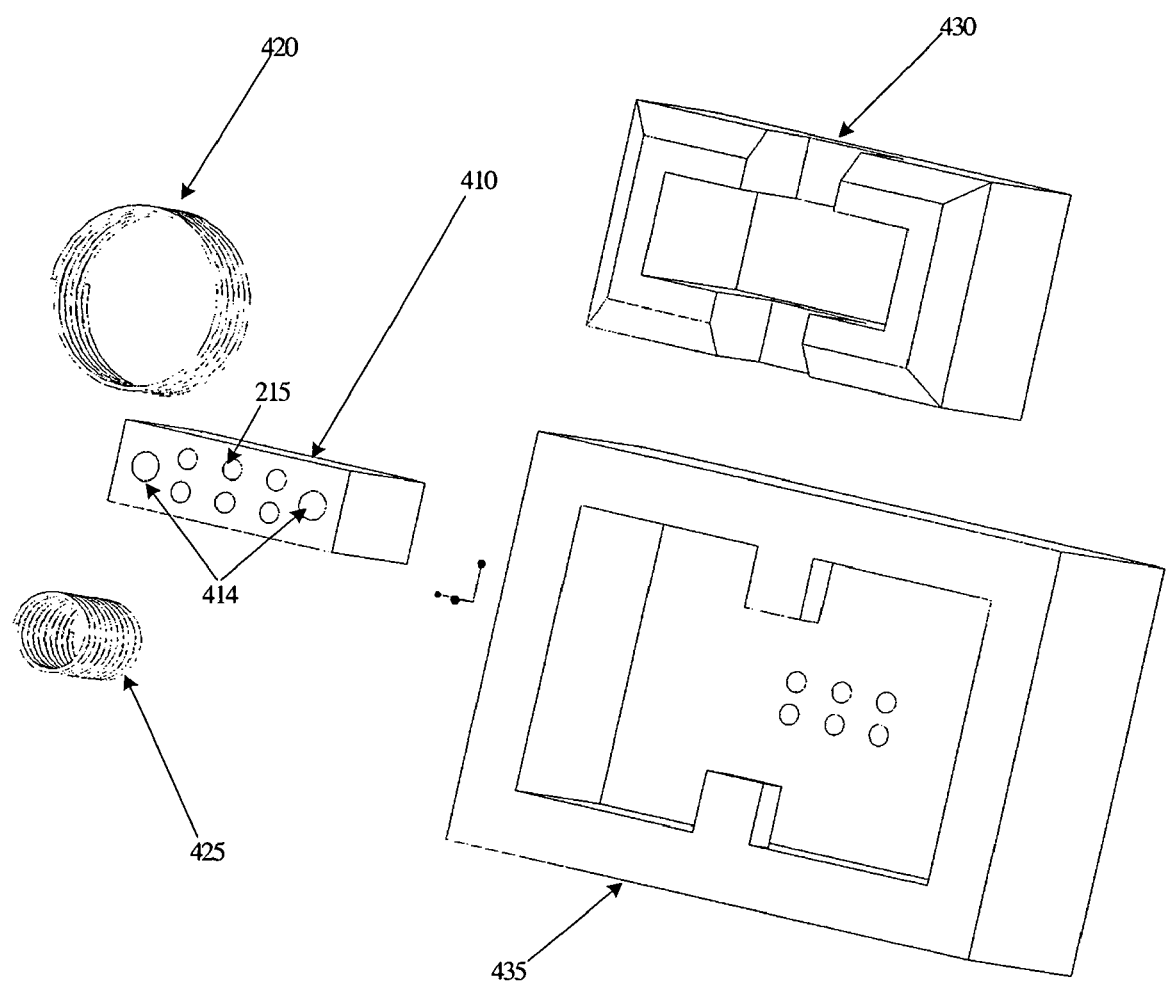
FIG. 4 illustrates an exploded view of one embodiment of a floating side of a fiber optic connector.

FIG. 3 illustrates a cross-section of one embodiment of floating component 210. Meanwhile, FIG. 4 illustrates an exploded view of one embodiment of a floating component 210. The parts of component 210 include a precision ferrule 410, springs 420 and 425, floating piece 430 and case 435. Ferrule 410 holds fibers 215 and includes alignment holes 414 for mating with the fixed component 220. Springs 420 and 425 aid in the alignment process and provide for tight optical mating. Floating piece 430 helps in the coarse alignment and guides ferrule 410 into position for the fine alignment. Case 435 holds the entire floating component 210 assembly together.

Figure 5:
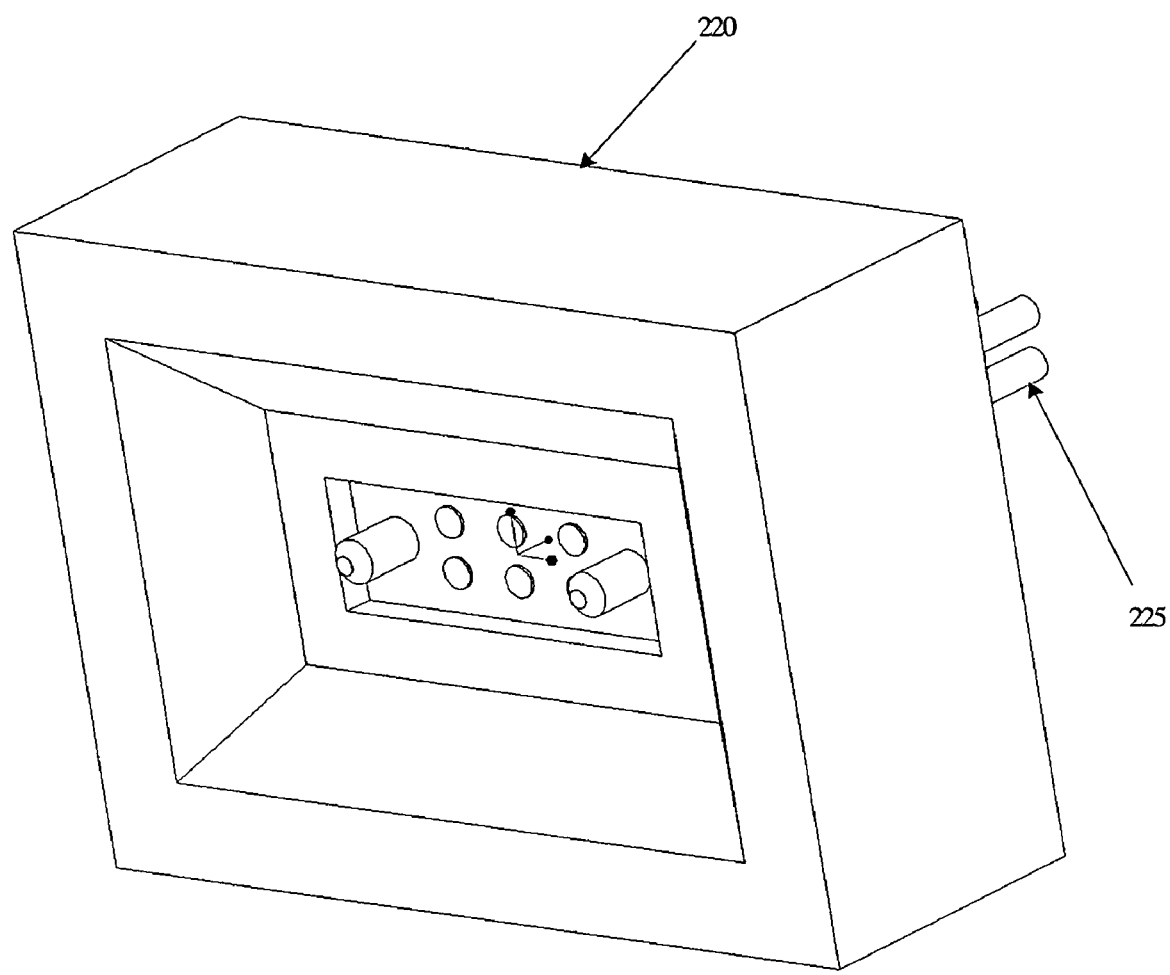
FIG. 5 illustrates one embodiment of a fixed side of a fiber optic connector.
Figure 6:
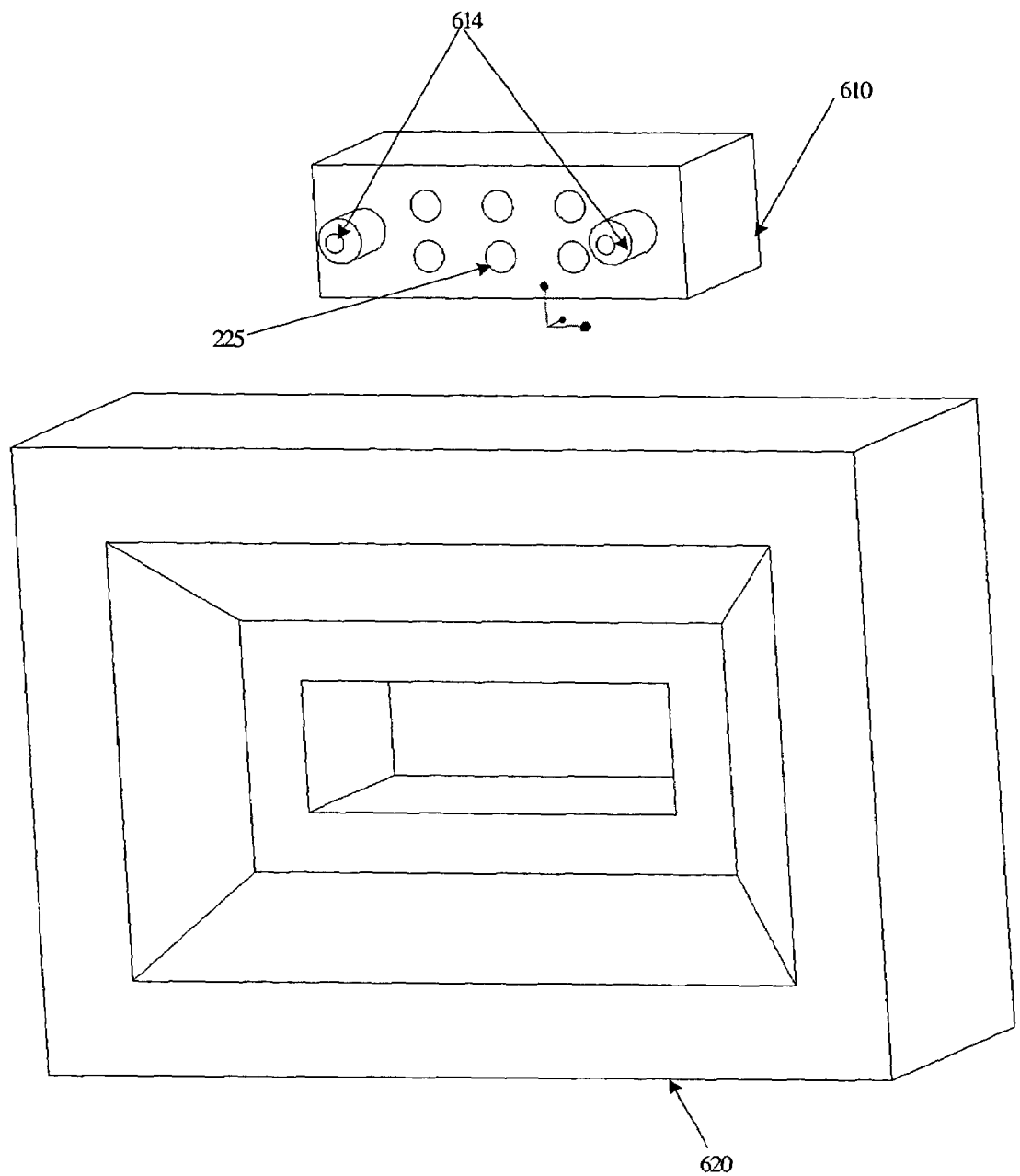
FIG. 6 illustrates an exploded view of one embodiment of a fixed side of a fiber optic connector.

FIG. 5 illustrates one embodiment of fixed component 220, while FIG. 6 illustrates an exploded view of one embodiment fixed component 220. The parts of component 220 include a precision ferrule 610 that holds fibers 225. In addition, ferrule 610 includes mating pins 614 that mate with the ferrule 410 of floating component 210. Further, component 220 includes a case 620 that holds ferrule 610, as well as help in the coarse alignment of floating piece 430 of component 210.

During operation of connector 200, a chamfered edge of floating piece 430 of component 210 comes into contact with a chamfered edge of case 620 of component 220 as the two sides of connector 200 approach one other. As the components continue to move closer towards each other, the chamfer on case 620 moves floating piece 430 closer into alignment.

As floating piece 430 moves into position it will also move ferrule 410 of component 210 into alignment. Once floating piece 430 has bottomed out on case 620 the two ferrule pieces, 410 and 610, will be close enough in alignment that a chamfer on alignment pins 614 in ferrule 610 will be able to guide the floating ferrule 410 into the final alignment position as connector 200 is plugged into its final position.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A method comprising:
  coupling a floating edge piece of a first side of an optical connector with a case edge of a second side of the connector; and coupling a first ferrule at the first side of the connector with a second ferrule at the second side of the connector once the floating piece is coupled to the case edge, by:
  providing a first spring for optical mating between the first ferrule and the floating edge piece; and
  providing a second spring for optical mating between the floating piece and the case.

2. The method of claim 1 wherein coupling the first ferrule with the second ferrule further comprises guiding alignment holes at the first side of the connector with alignment pins at the second side of the connector.

3. The method of claim 1 wherein the case moves the floating piece into alignment as the first and second sides of the connector move closer.

4. A connector comprising:
  a floating component to receive a first set of optical waveguides, the floating component including:
    a case;
    a first precision ferrule to couple the first set of optical waveguides; and
    a floating piece to float in at least two orthogonal directions within the case to guide the first precision ferrule into position for fine alignment, including:
      a first spring to provide for optical mating between the first precision ferrule and the floating piece; and
      a second spring to provide for optical mating between the floating piece and the case; and
  a fixed component to receive a second set of optical waveguides and to facilitate optical alignment between the first set of waveguides and the second set of waveguides through automated alignments with the first precision ferrule.

5. The connector of claim 4 wherein the first precision ferrule comprises at least one alignment hole to mate with the fixed component.

6. The connector of claim 4 wherein the fixed component comprises a second precision ferrule to couple the second set of optical waveguides.

7. The connector of claim 6 wherein the second precision ferrule comprises at least one mating pin to couple with the first precision ferrule in order to couple the second set of optical waveguides to the first set of optical waveguides.

8. The connector of claim 7 wherein the fixed component further comprises a case to hold the second precision ferrule.

9. The connector of claim 8 wherein the case assists in the course optical alignment of the floating piece of the floating component.

10. A system comprising:
  a backplane;
  a first set of optical waveguides coupled to the backplane;
  a first connecter component mounted on the backplane and coupled to the first set of optical waveguides;
  a blade;
  a second set of optical waveguides coupled to the blade; and
  a second connecter component, mounted on the blade and coupled to the second set of optical waveguides, including:
    a case;
    a first precision ferrule to couple the first set of optical waveguides; and
    a floating piece to float in at least two orthogonal directions within the case to guide the first precision ferrule into position for fine alignment, having:
      a first spring to provide for optical mating between the first precision ferrule and the floating piece; and
      a second spring to provide for optical mating between the floating piece and the case; and
    a fixed component to facilitate optical alignment between the first set of waveguides and the second set of waveguides through automated alignments with the first component when the blade is coupled to the backplane.

11. The system of claim 10 wherein the first precision ferrule comprises at least one alignment hole to mate with the fixed component.

12. The system of claim 11 wherein the first component comprises a second precision ferrule to couple the second set of optical waveguides.

13. The system of claim 12 wherein the second precision ferrule comprises at least one mating pin to couple with the at least one alignment hole at the first precision ferrule in order to couple the second set of optical waveguides to the first set of optical waveguides.

14. The system of claim 13 wherein the first component further comprises a case to hold the second precision ferrule.

15. The system of claim 14 wherein the case assists in the course optical alignment of the floating piece of the floating component.

* * * * *